(12) United States Patent
Iwaguchi et al.

(10) Patent No.: US 11,953,744 B2
(45) Date of Patent: Apr. 9, 2024

(54) OPTICAL FIBER RIBBON AND OPTICAL FIBER CABLE

(71) Applicant: SUMITOMO ELECTRIC INDUSTRIES, LTD., Osaka (JP)

(72) Inventors: Noriaki Iwaguchi, Osaka (JP); Takashi Fujii, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/905,353

(22) PCT Filed: Jan. 18, 2021

(86) PCT No.: PCT/JP2021/001508
§ 371 (c)(1),
(2) Date: Aug. 31, 2022

(87) PCT Pub. No.: WO2021/181884
PCT Pub. Date: Sep. 16, 2021

(65) Prior Publication Data
US 2023/0140824 A1      May 4, 2023

(30) Foreign Application Priority Data
Mar. 9, 2020   (JP) ................................. 2020-039642

(51) Int. Cl.
*G02B 6/44*      (2006.01)
(52) U.S. Cl.
CPC ................................. *G02B 6/4403* (2013.01)
(58) Field of Classification Search
CPC .................................................. G02B 6/4403

USPC .......................................................... 385/114
See application file for complete search history.

(56) References Cited

U.S. PATENT DOCUMENTS

| 5,949,940 A * | 9/1999 | Botelho ............... | G02B 6/4403 385/114 |
| 6,197,422 B1* | 3/2001 | Murphy ............... | G02B 6/4482 522/12 |
| 2016/0161692 A1* | 6/2016 | Namazue ............. | G02B 6/2555 385/114 |

(Continued)

FOREIGN PATENT DOCUMENTS

| JP | 2000-231044 A | 8/2000 |
| JP | 2008-250076 A | 10/2008 |

(Continued)

OTHER PUBLICATIONS

International Search Report issued in Patent Application No. PCT/JP2021/001508 dated Mar. 16, 2021.

*Primary Examiner* — Jerry M Blevins
(74) *Attorney, Agent, or Firm* — PEARNE & GORDON LLP

(57) ABSTRACT

An optical fiber ribbon comprises a plurality of optical fibers arranged in parallel and a connecting resin layer containing a ribbon resin for coating and connecting the plurality of optical fibers, wherein each of the plurality of optical fibers has an outer diameter of 220 µm or less; and the ribbon resin contains a cured product of urethane (meth)acrylate, and an amount of silicon is 5 ppm or more and 80000 ppm or less and an amount of tin is 5 ppm or more and 30000 ppm or less at the surface of the connecting resin layer.

7 Claims, 5 Drawing Sheets

(56) References Cited

U.S. PATENT DOCUMENTS

2017/0371122 A1   12/2017  Kouzmina et al.
2018/0273427 A1    9/2018  Tanaka et al.
2021/0132289 A1*  5/2021  Chien ................ G02B 6/02395

FOREIGN PATENT DOCUMENTS

| | | |
|---|---|---|
| JP | 2011-158580 A | 8/2011 |
| JP | 2011-158581 A | 8/2011 |
| JP | 2013-088617 A | 5/2013 |
| JP | 2014-157382 A | 8/2014 |
| JP | 5737220 B2 | 6/2015 |
| JP | 5779940 B2 | 9/2015 |
| JP | 5880270 B2 | 3/2016 |
| WO | 2008/120985 A1 | 10/2008 |

* cited by examiner

OPTICAL FIBER RIBBON AND OPTICAL FIBER CABLE

TECHNICAL FIELD

The present disclosure relates to an optical fiber ribbon and an optical fiber cable.

The present application claims priority based on Japanese Patent Application No. 2020-039642 filed on Mar. 9, 2020, and incorporates all the content described in the Japanese Patent Application.

BACKGROUND ART

An optical fiber ribbon including a plurality of optical fibers arranged and collectively integrated with a coating layer is known. For example, Patent Literature 1 discloses connection of optical fibers having a thin diameter (outer diameter of optical fiber: 220 μm or less) using a resin due to densification and thinning of an optical fiber cable accommodating an optical fiber ribbon.

CITATION LIST

Patent Literature

Patent Literature 1: JP 2013-88617 A

SUMMARY OF INVENTION

The optical fiber ribbon according to one aspect of the present disclosure comprises a plurality of optical fibers arranged in parallel and a connecting resin layer containing a ribbon resin for coating and connecting the plurality of optical fibers, wherein each of the plurality of optical fibers has an outer diameter of 220 μm or less; and the ribbon resin contains a cured product of urethane (meth)acrylate, and an amount of silicon is 5 ppm or more and 80000 ppm or less and an amount of tin is 5 ppm or more and 30000 ppm or less at the surface of the connecting resin layer.

DESCRIPTION OF EMBODIMENTS

Figure 1:
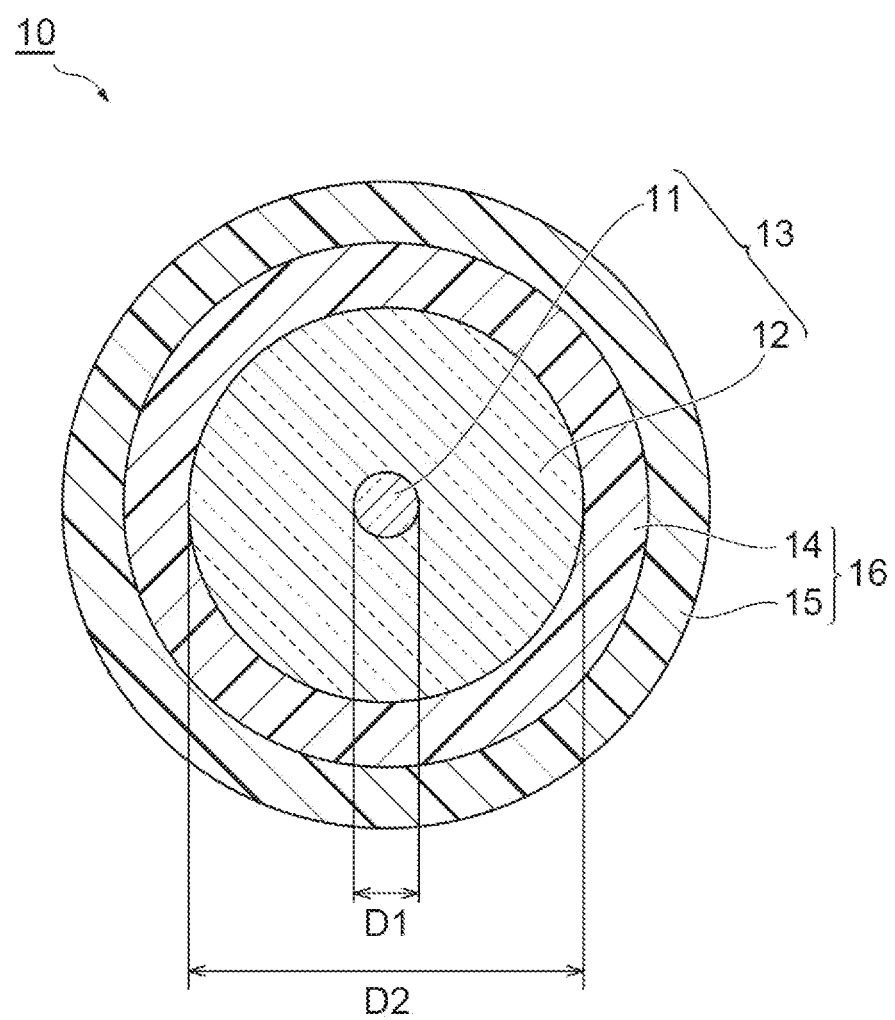
FIG. 1 is a schematic cross-sectional view showing an example of an optical fiber.

Problem to be Solved by the Present Disclosure

A small-diameter optical fiber is more susceptible to lateral pressure due to bending than an optical fiber having an outer diameter of 250 μm, when the optical fiber ribbon is wound around a bobbin or made into an optical cable, so that the lateral pressure resistance is weak and transmission loss tends to increase. Further, in the case of an optical fiber ribbon having small-diameter optical fibers, the contact area between the optical fibers and the ribbon resin coating the optical fibers is small, so that low adhesion of the ribbon resin to the optical fibers tends to cause peeling of the ribbon resin. On the other hand, excessively high adhesion of the ribbon resin to the optical fiber tends to cause difficulty in separation of the optical fibers into single fibers when fixing a terminal of the optical fiber ribbon.

An object of the present disclosure is to provide an optical fiber ribbon composed of small-diameter optical fibers that can achieve both peeling resistance and single-fiber separability and suppress an increase in transmission loss of an optical cable.

Effects of the Present Disclosure

According to the present disclosure, an optical fiber ribbon composed of small-diameter optical fibers that can achieve both peeling resistance and single-fiber separability and suppress an increase in transmission loss of an optical cable can be provided.

Description of Embodiments of the Present Disclosure

First, the embodiments of the present disclosure will be listed and described. The optical fiber ribbon according to one aspect of the present disclosure comprises a plurality of optical fibers arranged in parallel and a connecting resin layer containing a ribbon resin for coating and connecting the plurality of optical fibers, wherein each of the plurality of optical fibers has an outer diameter of 220 μm or less; and the ribbon resin contains a cured product of urethane (meth)acrylate, and the amount of silicon is 5 ppm or more and 80000 ppm or less and the amount of tin is 5 ppm or more and 30000 ppm or less at the surface of the connecting resin layer.

The optical fiber ribbon according to the present embodiment can achieve both peeling resistance and single-fiber separability, can be bent sharply when densely accommodated in a cable, and can suppress an increase in transmission loss during bobbin winding or cable making.

Due to superior single-fiber separability of the optical fibers, it is preferable that the amount of silicon be 100 ppm or more and 60000 ppm or less, and the amount of tin be 10 ppm or more and 20000 ppm or less. Due to easiness in obtaining an optical fiber ribbon having excellent fusion splicing property, it is preferable that the average distance between the centers of adjacent optical fibers among the plurality of optical fibers be 220 μm or more and 280 μm or less.

Due to easiness in controlling the adhesion between the optical fiber and the ribbon resin, the ribbon resin may further contain a silicone-based lubricant.

Due to easy deformation of the optical fiber ribbon when accommodated in a cable, the optical fiber ribbon according to the present embodiment may have a connecting portion and a non-connecting portion intermittently in the longitudinal direction and the width direction.

Due to easy deformation of the optical fiber ribbon when accommodated in a cable, the connecting resin layer may have a recess at the portion connecting adjacent optical fibers among the plurality of optical fibers.

In the optical fiber cable according to one aspect of the present disclosure, the optical fiber ribbon is incorporated in a cable. The optical fiber cable provided with the optical fiber ribbon according to the present embodiment can achieve both high lateral pressure characteristics and low transmission loss.

Details of Embodiments of the Present Disclosure

Specific examples of the optical fiber ribbon and the optical fiber cable according to embodiments of the present disclosure will be described with reference to drawings on an as needed basis. The present disclosure is not limited to these examples, being shown in the scope of claims and intended to include equivalents to the claims and all modifications within the scope of the claims. In the following description, the same elements will be denoted by the same reference numerals in the description of the drawings, and duplicate description will be omitted. In the present embodiment, a (meth)acrylate means an acrylate or a methacrylate corresponding thereto, and the same applies to other similar expressions such as (meth)acryloyl.

<Optical Fiber Ribbon>

The optical fiber ribbon according to the present embodiment includes a plurality of optical fibers arranged in parallel which are coated with a ribbon resin. The ribbon resin connects the plurality of optical fibers to form a connecting resin layer.

The amount of silicon (Si) at the surface of the connecting resin layer is 5 ppm or more and 80000 ppm or less, and the amount of tin (Sn) at the surface of the connecting resin layer is 5 ppm or more and 30000 ppm or less. From the viewpoint of further improving the single-fiber separability of the optical fibers, the amount of silicon is preferably 100 ppm or more and 60000 ppm or less, more preferably 1000 ppm or more and 55000 ppm or less, and still more preferably 1500 ppm or more and 50000 ppm or less. From the viewpoint of further improving the single-fiber separability of the optical fibers, the amount of tin is preferably 10 ppm or more and 20000 ppm or less, more preferably 10 ppm or more and 10000 ppm or less, and still more preferably 10 ppm or more and 5000 ppm or less. In the present specification, ppm indicates a weight ratio.

The amounts of silicon and tin at the surface of the connecting resin layer may be determined by X-ray photoelectric analysis of the surface of the optical fiber ribbon.

The silicon may be derived from a component having a silicon atom contained in the ribbon resin for forming the connecting resin layer. Examples of the component having a silicon atom include a silane coupling agent, a silicone-based lubricant, and silica particles. The tin may be derived from urethane (meth)acrylate contained in the ribbon resin for forming the connecting resin layer. The urethane (meth)acrylate is synthesized from a base, an organometallic catalyst, etc. From the viewpoint of manufacturability, among organometallic catalysts, tin catalysts may be used for synthesis.

By containing a cured product of urethane (meth)acrylate in a ribbon resin (connecting resin), the elasticity of the connecting resin layer can be improved. The resin composition for the ribbon may contain urethane (meth)acrylate, a monomer and a photopolymerization initiator. The urethane (meth)acrylate, the monomer and the photopolymerization initiator may be appropriately selected from the resin compositions described as examples for forming a primary resin layer to be described later.

The ribbon resin may further contain a silicone-based lubricant. Examples of the silicone-based lubricant include a silicone oil. The silicone oil may be a high molecular weight silicone oil or a modified silicone oil having a part of the dimethylsiloxane moiety modified with an organic group. Examples of the modified silicone oil include a polyether-modified, amine-modified, epoxy-modified, mercapto-modified, (meth)acrylic-modified, or carboxyl-modified silicone oil. With a too small molecular weight, the silicone oil used for the ribbon resin tends to bleed out, so that the adhesion to the ink resin layer decreases. With a too large molecular weight of the silicone oil, the compatibility with the resin component decreases. It is preferable that the average molecular weight of the silicone oil be 10000 or more and 100000 or less. Due to containing a silicone-based lubricant, the ribbon resin can suppress the sticking of the optical fiber ribbons to each other, and allows the loss increase to be easily reduced when made into a cable.

The Young's modulus of the ribbon resin at 23° C. is preferably 50 MPa or more and 900 MPa or less, more preferably 100 MPa or more and 850 MPa or less, and still more preferably 400 MPa or more and 800 MPa or less, from the viewpoint of ensuring compatibility between the lateral pressure resistance characteristics and flexibility of the optical fiber ribbon.

FIG. 1 is a schematic cross-sectional view showing an example of an optical fiber. An optical fiber 10 includes a glass fiber 13 including a core 11 and a cladding 12, and a coating resin layer 16 including a primary resin layer 14 and a secondary resin layer 15 provided on the outer periphery of a glass fiber 13.

The cladding 12 surrounds the core 11. The core 11 and the cladding 12 mainly include glass such as silica glass. For example, the core 11 may be made of silica glass with addition of germanium or pure silica glass, and the cladding 12 may be made of pure silica glass or silica glass with addition of fluorine.

In FIG. 1, the outer diameter of the optical fiber 10 is 220 μm or less, and may be 140 μm or more and 220 μm or less, or 170 μm or more and 220 μm or less. The outer diameter (D2) of the glass fiber 13 is about 100 μm to 125 μm, and the diameter (D1) of the core 11 constituting the glass fiber 13 may be about 7 μm to 15 μm. The thickness of each of the primary resin layer 14 and the secondary resin layer 15 may be about 5 μm to 50 μm.

The primary resin layer 14 may be formed by curing an ultraviolet curable resin composition containing a photopolymerizable compound, a photopolymerization initiator, and a silane coupling agent.

The photopolymerizable compound may contain an oligomer and a monomer. Examples of the oligomer include a urethane (meth)acrylate and an epoxy (meth)acrylate.

The urethane (meth)acrylate may be a compound obtained by reacting a polyol compound, a polyisocyanate compound, and a hydroxyl group-containing (meth)acrylate compound.

Examples of the polyol compound include polytetramethylene glycol, polypropylene glycol, and bisphenol A/ethylene oxide addition diol. From the viewpoint of adjusting Young's modulus, the number average molecular weight of the polyol compound may be 300 or more and 8000 or less. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol (meth)acrylate.

An organometallic catalyst may be used as a catalyst for synthesizing urethane (meth)acrylate, and an organotin compound may be used from the viewpoint of manufacturability. Examples of the organotin compound include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. From the viewpoint of easy availability or catalytic performance, it is preferable to use dibutyltin dilaurate or dibutyltin diacetate as the catalyst. Although it is desirable to use a large amount of catalyst from the viewpoint of productivity, it is desirable to control the amount in an appropriate range to avoid bleeding out on the surface of the resin layer which easily reduces the adhesion between the ribbon resin and the ink resin layer.

A lower alcohol having 5 or less carbon atoms may be used for synthesizing the urethane (meth)acrylate. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Epoxy (meth)acrylate is a compound obtained by reacting an epoxy compound having two or more glycidyl groups with a compound having a (meth)acryloyl group.

As the monomer, a monofunctional monomer having one polymerizable group and a polyfunctional monomer having two or more polymerizable groups may be used. Two or more types of monomers may be mixed for use.

Examples of the monofunctional monomer include (meta) acrylate-based monomers such as methyl (meth)acrylate, ethyl (meth)acrylate, propyl (meth)acrylate, n-butyl (meth) acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meta)acrylate, isooctyl (meth)acrylate, isodecyl (meth) acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenolpolyethylene glycol (meta) acrylate, nonylphenol EO-modified acrylate, nonylphenoxypolyethylene glycol (meth)acrylate, and isobornyl (meth) acrylate; carboxyl group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocyclic ring-containing (meth)acrylates such as N-acryloyl morpholine, N-vinylpyrrolidone, N-vinylcaprolactam, N-acryloyl piperidine, N-methacryloyl piperidine, N-acryloyl pyrrolidine, 3-(3-pyridyl)propyl (meth)acrylate, and cyclic trimethylolpropane formal acrylate; maleimide-based monomers such as maleimide, N-cyclohexyl maleimide, and N-phenyl maleimide; N-substituted amide-based monomers such as (meth) acrylamide, N,N-dimethyl (meth)acrylamide, N,N-diethyl (meth)acrylamide, N-hexyl (meth)acrylamide, N-methyl (meth)acrylamide, N-ethyl (meth)acrylamide, N-butyl (meth)acrylamide, N-methylol (meth)acrylamide, and N-methylolpropane (meth)acrylamide; aminoalkyl (meth) acrylate-based monomers such as aminoethyl (meth)acrylate, aminopropyl (meth)acrylate, N,N-dimethylaminoethyl (meth)acrylate, and tert-butylaminoethyl (meth)acrylate; and succinimide-based monomers such as N-(meth)acryloyl oxymethylene succinimide, and N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, neopentyl glycol hydroxypivalate di(meth)acrylate, 1,4-butanediol di(meth) acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecane diol di(meth)acrylate, 1,20-eicosane diol di(meth)acrylate, isopentyl diol di(meth)acrylate, 3-ethyl-1,8-octane diol di(meth)acrylate, di(meth)acrylate of EO adduct of bisphenol A, trimethylolpropane tri(meth)acrylate, trimethyloloctane tri (meth)acrylate, trimethylolpropane polyethoxy tri(meth) acrylate, trimethylolpropane polypropoxy tri(meth)acrylate, trimethylolpropane polyethoxypolypropoxy tri(meth)acrylate, tris[(meth)acryloyloxyethyl]isocyanurate, pentaerythritol tri(meth)acrylate, pentaerythritol polyethoxy tetra(meth) acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meta)acryloyloxyethyl]isocyanurate.

The photopolymerization initiator may be appropriately selected from known radical photopolymerization initiators for use. Examples of the photopolymerization initiators include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentylphosphine oxide, 2-methyl-1-[4-(methylthio)phenyl]-2-morpholino-propane-1-one (Omnirad 907, manufactured by IGM Resins), 2,4,6-trimethylbenzoyldiphenylphosphine oxide (Omnirad TPO, manufactured by IGM Resins), and bis(2,4,6-trimethylbenzoyl)phenylphosphine oxide (Omnirad 819, manufactured by IGM Resins).

The silane coupling agent is not particularly limited as long as it causes no inhibition in curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, and β-(3,4-epoxylcyclohexyl)-ethyltrimethoxysilane, dimethoxydimethylsilane, diethoxydimethylsilane, 3-acryloxypropyl trimethoxysilane, 3-glycidoxypropyl trimethoxysilane, 3-glycidoxypropylmethyl diethoxysilane, 3-methacryloxypropyl trimethoxysilane, N-(β-aminoethyl)-γ-aminopropyltrimethoxysilane, N-(β-aminoethyl)-γ-aminopropyltrimethyl dimethoxysilane, N-phenyl-3-aminopropyl trimethoxysilane, 3-chloropropyl trimethoxysilane, 3-mercaptopropyl trimethoxysilane, 3-aminopropyl trimethoxysilane, bis-[3-(triethoxysilyl)propyl]tetrasulfide, bis-[3-(triethoxysilyl) propyl]disulfide, γ-trimethoxysilylpropyl dimethylthiocarbamyl tetrasulfide, and γ-trimethoxysilylpropyl benzothiazyl tetrasulfide.

The resin composition may further contain an inorganic oxide particle, a photoacid generator, a leveling agent, an antifoaming agent, an antioxidant, a sensitizer, etc.

The inorganic oxide particle is not particularly limited. From the viewpoint of excellent dispersibility in the resin composition and easy adjustment of Young's modulus, it is preferable that the inorganic oxide particle be a particle containing at least one selected from the group consisting of silicon dioxide (silica), zirconium dioxide (zirconia), aluminum oxide (alumina), magnesium oxide (magnesia), titanium oxide (titania), tin oxide, and zinc oxide. It is more preferable to use silica particle as the inorganic oxide particle, from the viewpoints of low cost, easy surface treatment, ultraviolet permeability, and capability of imparting appropriate hardness to a cured product easily.

It is preferable that the inorganic oxide particle be hydrophobic. Specifically, it is preferable that the surface of the inorganic oxide particle be hydrophobically treated with a silane compound. The hydrophobic treatment means introducing a hydrophobic group into the surface of an inorganic oxide particle. The inorganic oxide particle with a hydrophobic group introduced has excellent dispersibility in a resin composition. Examples of the hydrophobic group may include an ultraviolet curable reactive group such as a (meth)acryloyl group and a vinyl group, or a non-reactive group such as a hydrocarbon group (for example, alkyl group) and an aryl group (for example, phenyl group). In the case where the inorganic oxide particle has a reactive group, a resin layer having a high Young's modulus may be easily formed.

Examples of the silane compound having a reactive group include a silane compound such as 3-methacryloxypropyl trimethoxysilane, 3-acryloxypropyl trimethoxysilane, 3-methacryloxypropyl triethoxysilane, 3-acryloxypropyl triethoxysilane, 8-methacryloxyoctyl trimethoxysilane, 8-acryloxyoctyl trimethoxysilane, 7-octenyl trimethoxysilane, vinyl trimethoxysilane, and vinyl triethoxysilane.

Examples of the silane compound having an alkyl group include methyl trimethoxysilane, dimethyl dimethoxysilane, ethyl trimethoxysilane, propyl trimethoxysilane, butyl trimethoxysilane, pentyl trimethoxysilane, hexyl trimethoxysilane, and octyl trimethoxysilane, methyl triethoxysilane, dimethyl diethoxysilane, ethyl triethoxysilane, propyl triethoxysilane, butyl triethoxysilane, pentyl triethoxysilane, hexyl triethoxysilane, and octyl triethoxysilane.

The inorganic oxide particle may be dispersed in a dispersion medium when added to the resin composition. By using the inorganic oxide particles dispersed in the dispersion medium, the inorganic oxide particles may be uniformly dispersed in the resin composition, so that the storage stability of the resin composition can be improved. The dispersion medium is not particularly limited as long as it causes no inhibition of the curing of the resin composition. The dispersion medium may be reactive or non-reactive.

As the reactive dispersion medium, a monomer such as a (meth)acryloyl compound or an epoxy compound may be used. Examples of the (meth)acrylic compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl acrylate, (meth)acrylic acid adduct of propylene glycol diglycidyl ether, (meth)acrylic acid adduct of tripropylene glycol diglycidyl ether, and (meth)acrylic acid adduct of glycerol diglycidyl ether. As the dispersion medium, a (meth)acryloyl compound such as the monomer described above may be used.

As the non-reactive dispersion medium, a ketone solvent such as methyl ethyl ketone (MEK) and methyl isobutyl ketone (MIBK), an alcohol solvent such as methanol (MeOH) and propylene glycol monomethyl ether (PGME), or an ester solvent such as propylene glycol monomethyl ether acetate (PGMEA) may be used. In the case of the non-reactive dispersion medium, after mixing of the base resin and inorganic oxide particles dispersed in a dispersion medium, a part of the dispersion medium may be removed to prepare a resin composition.

From the viewpoint of excellent dispersibility in the resin composition, the average primary particle size of the inorganic oxide particles may be 650 nm or less, preferably 600 nm or less, more preferably 500 nm or less, still more preferably 400 nm or less. From the viewpoint of excellent strength after curing, the average primary particle size of the inorganic oxide particles is preferably 5 nm or more, more preferably 10 nm or more. The average primary particle size may be measured by, for example, image analysis of an electron micrograph, a light scattering method, a BET method, or the like. The dispersion medium in which the primary particles of the inorganic oxide having a small particle size are dispersed is visually transparent. The dispersion medium in which the primary particles having a relatively large particle size (40 nm or more) are dispersed is cloudy, though no sediment is observed.

The content of the inorganic oxide particles based on the total amount of the resin composition may be 1 mass % or more and 45 mass % or less, 2 mass % or more and 40 mass % or less, or 3 mass % or more and 35 mass % or less. With a content of the inorganic oxide particles of 1 mass % or more, a tough cured product tends to be formed. With a content of the inorganic oxide particles of 45 mass % or less, a cured product in which the inorganic oxide particles are suitably dispersed tends to easily be formed. The total amount of the resin composition and the total amount of the cured product of the resin composition may be substantially the same.

As the photoacid generator, an onium salt having an $A^+B^-$ structure may be used. Examples of the photoacid generator include a sulfonium salt such as UVACURE1590 (manufactured by Daicel-Cytec), CPI-100P, 110P, and 210S (manufactured by San-Apro), and an iodonium salt such as Omnicat 250 (manufactured by IGM Resins), WPI-113 (manufactured by Fujifilm Wako Pure Chemical Corporation), and Rp-2074 (manufactured by Rhodia Japan).

From the viewpoint of suppressing the generation of voids in the optical fiber, the Young's modulus of the primary resin layer at 23° C. is preferably 0.04 MPa or more and 0.8 MPa or less, more preferably 0.05 MPa or more and 0.7 MPa or less, and still more preferably 0.05 MPa or more and 0.6 MPa or less.

The secondary resin layer 15 may be formed by curing, for example, an ultraviolet curable resin composition containing a urethane (meth)acrylate, a monomer and a photopolymerization initiator. The urethane (meth)acrylate, the monomer and the photopolymerization initiator may be appropriately selected from the resin compositions described as examples for forming the primary resin layer. The secondary resin layer 15 may contain an inorganic oxide particle such as silica and alumina. However, the resin composition for forming the secondary resin layer has a composition different from the resin composition for forming the primary resin layer.

The Young's modulus of the secondary resin layer at 23° C. is preferably 900 MPa or more, more preferably 1000 MPa or more, and still more preferably 1200 MPa or more. The Young's modulus of the secondary resin layer at 23° C. may be 3000 MPa or less, 2500 MPa or less, 2000 MPa or less, or 1800 MPa or less. With a Young's modulus of the secondary resin layer of 900 MPa or more, the lateral pressure resistance characteristics are easily improved, while with a Young's modulus of 3000 MPa or less, the secondary resin layer has an appropriate breaking elongation to be hardly broken during coating removal, resulting in excellent coating removability.

On the outer periphery of the secondary resin layer 15 that constitutes the coating resin layer 16, a colored layer that serves as ink layer for identifying an optical fiber may be formed. Alternatively, the secondary resin layer 15 may be a colored layer. From the viewpoint of improving identification of an optical fiber, it is preferable that the colored layer contain a pigment. Examples of the pigment include a colored pigment such as carbon black, titanium oxide and zinc flower, a magnetic powder such as $\gamma$-$Fe_2O_3$, a mixed crystal of $\gamma$-$Fe_2O_3$ and $\gamma$-$Fe_3O_4$, $CrO_2$, cobalt ferrite, cobalt-deposited iron oxide, barium ferrite, Fe—Co and Fe—Co—Ni, an inorganic pigment such as MIO, zinc chromate, strontium chromate, aluminum tripolyphosphate, zinc, alumina, glass and mica; and an organic pigment such as an azo-based pigment, a phthalocyanine-based pigment, and a dyed lake pigment. The pigment may be subjected to treatments such as various types of surface modification and pigment hybridization.

The characteristics of the optical fiber used in the present disclosure may include, for example, a mode field diameter of 8.2 μm or more and 9.6 μm or less at a wavelength of 1310 nm, a cable cutoff wavelength of 1260 nm or less, and a loss increase of 0.1 dB or less at a wavelength of 1625 nm when wound with 100 turns around a mandrel having a radius of 30 mm (per 100 turns), or a loss increase of 1.0 dB or less at a wavelength of 1625 nm when wound with 10 turns around a mandrel having a radius of 15 mm (per 10 turns).

Figure 2:
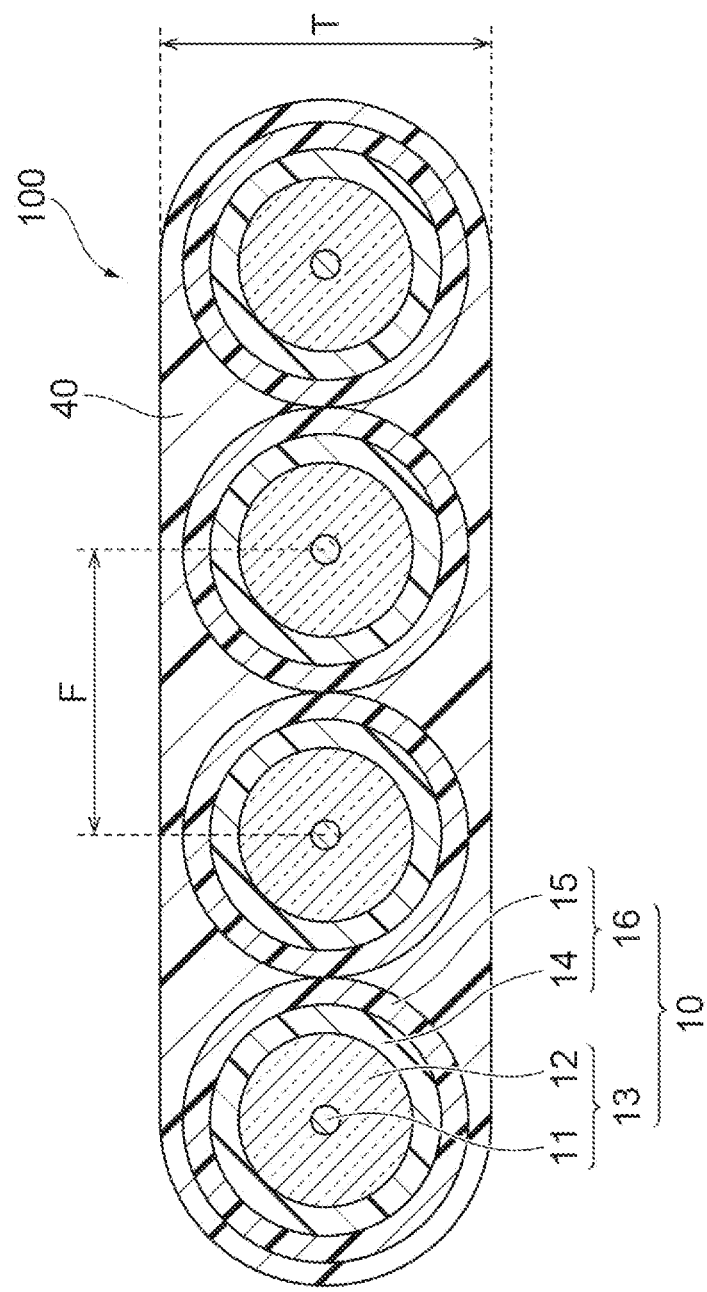
FIG. 2 is a schematic cross-sectional view showing an optical fiber ribbon according to an embodiment.

FIG. 2 is a schematic cross-sectional view showing an optical fiber ribbon according to an embodiment. An optical fiber ribbon 100 has a plurality of optical fibers 10 and a connecting resin layer 40 in which the optical fibers 10 are (integrally) coated with a ribbon resin and connected. It is preferable that the Young's modulus of the ribbon resin at 23° C. be 800 MPa or less. In FIG. 2, four optical fibers 10 are shown as an example, though the number thereof is not particularly limited.

The optical fibers 10 in contact with each other in parallel may be integrated, or a part or all of the optical fibers 10 in parallel at regular intervals may be integrated. The distance F between the centers of the adjacent optical fibers 10 may be 220 μm or more and 280 μm or less. In the case where the distance between the centers is controlled to 220 μm or more and 280 μm or less, it is easy to place the optical fibers in existing V-grooves, so that an optical fiber ribbon having excellent fusion splicing property can be obtained. The thickness T of the optical fiber ribbon 100 may be 164 μm or more and 285 μm or less, though depending on the outer diameter of the optical fiber 10.

Figure 3:
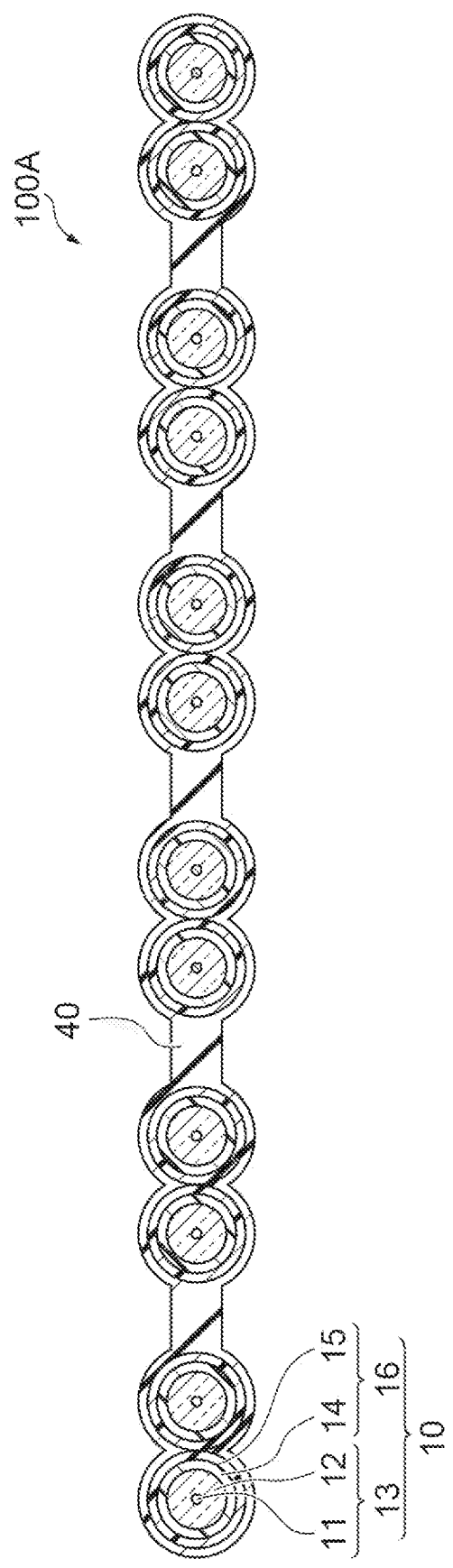
FIG. 3 is a schematic cross-sectional view showing an optical fiber ribbon according to an embodiment.

FIG. 3 is a schematic cross-sectional view showing an example of the optical fiber ribbon having optical fibers integrated in parallel at regular intervals. An optical fiber ribbon 100A shown in FIG. 3 includes sets of two optical fibers 10 at regular intervals connected by a ribbon resin, with a total of 12 optical fibers 10. The ribbon resin forms a connecting resin layer 40.

In the case where the optical fibers 10 are arranged in parallel at regular intervals, that is, in the case where the adjacent optical fibers 10 are joined through the ribbon resin without contacting each other, the thickness of the connecting portion at the center of the optical fibers 10 may be 150 μm or more and 220 μm or less. The optical fiber ribbon may have a recess at the connecting portion of the optical fiber, due to easy deformation of the optical fiber ribbon when accommodated in a cable. The recess may be formed in a triangular shape having a narrow angle on one surface of the connecting portion.

Figure 4:
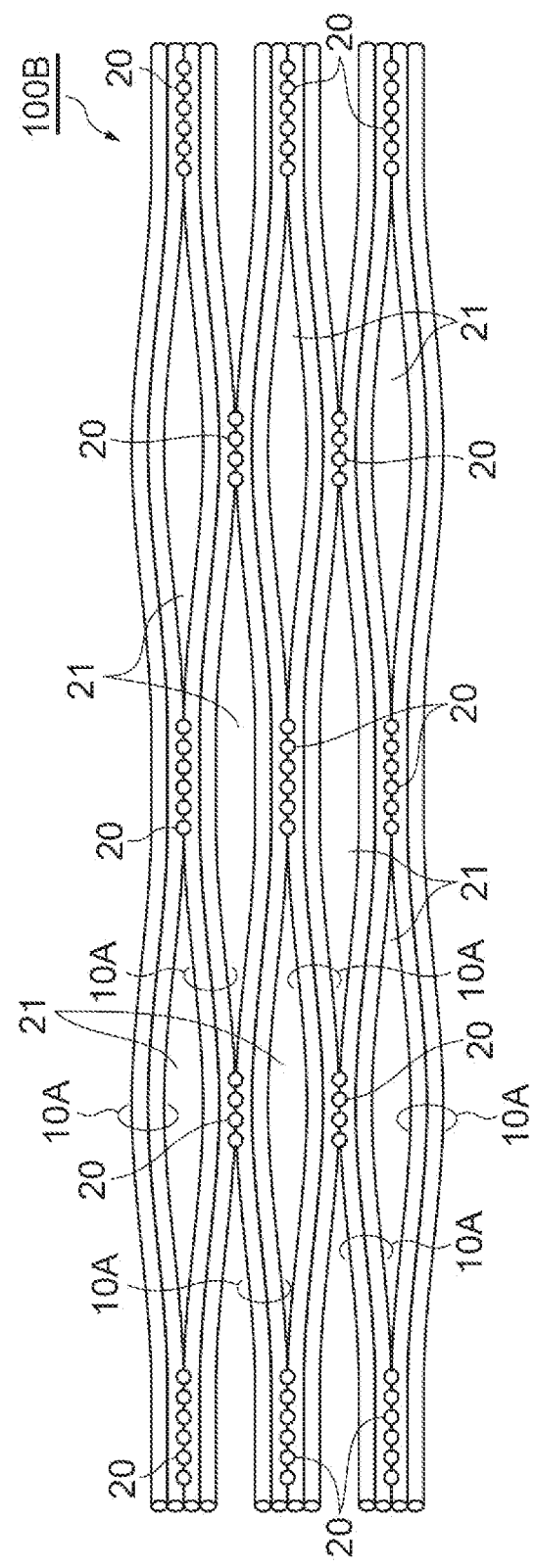
FIG. 4 is a plan view showing the appearance of an intermittent optical fiber ribbon according to an embodiment.

The optical fiber ribbon according to the present embodiment may have a connecting portion and a non-connecting portion intermittently in the longitudinal direction and the width direction. FIG. 4 is a plan view showing the appearance of the optical fiber ribbon according to an embodiment. An optical fiber ribbon 100B has a plurality of optical fibers, a plurality of connecting portions 20, and non-connecting portions (dividing portions) 21. The non-connecting portion 21 is formed intermittently in the longitudinal direction of the optical fiber ribbon. The optical fiber ribbon 100B is an intermittently connected optical fiber ribbon in which the connecting portion 20 and the non-connecting portion 21 are intermittently provided in the longitudinal direction for each of the two optical fibers 10A. The "connecting portion" refers to a portion in which adjacent optical fibers are integrated through a connecting resin layer, and the "non-connecting portion" refers to a portion in which adjacent optical fibers are not integrated through a connecting resin layer, having a gap portion between the optical fibers.

Since the optical fiber ribbon having the structure described above is provided with the non-connecting portion 21 intermittently in the connecting portion 20 for each of the two fibers, the optical fiber ribbon is easily deformed. Therefore, the optical fiber ribbon is easily rolled for incorporation in the optical fiber cable, so that the optical fiber ribbon suitable for high-density packaging can be obtained. Further, since the connecting portion 20 can be easily torn from the non-connecting portion 21 as a starting point, single fiber separation of the optical fiber 10 in the optical fiber ribbon is easily performed.

The intermittently connected optical fiber ribbon may be manufactured by using, for example, a manufacturing apparatus having a swing blade described in JP 5779940 B, JP 5880270 B, or JP 5737220 B.

<Optical Fiber Cable>

The optical fiber cable according to the present embodiment includes the optical fiber ribbon incorporated in the cable. Examples of the optical fiber cable include a slot-type optical fiber cable having a plurality of slot grooves. The optical fiber ribbon can be incorporated in the slot groove, such that the packaging density in each of the slot grooves is about 25% to 65%. The packaging density means the ratio of the cross-sectional area of the optical fiber ribbon incorporated in the slot groove relative to the cross-sectional area of the slot groove.

EXAMPLES

Hereinafter, the results of the evaluation tests in Examples and Comparative Examples according to the present disclosure will be shown to describe the present disclosure in more detail. The present invention, however, is not limited to these Examples.

[Resin Composition for Ribbon]
(Oligomer)

Urethane acrylates UA-1 to 6 were obtained by reacting polypropylene glycol having a molecular weight of 1000, 2,4-tolylene diisocyanate and 2-hydroxyethyl acrylate, with use of dibutyltin dilaurate as catalyst. UA-1 to 6 were prepared by changing the amount of dibutyltin dilaurate compounded.

(Monomer)

As monomers, 2-phenoxyethyl acrylate, tripropylene glycol diacrylate, and N-vinylcaprolactam were prepared.

(Photopolymerization Initiator)

As photopolymerization initiators, 1-hydroxycyclohexyl phenyl ketone and 2,4,6-trimethylbenzoyl diphenylphosphine oxide were prepared.

(Silicone-Based Lubricant)

As the silicone-based lubricant, a modified silicone oil (polyether modified, average molecular weight: 15000) was prepared.

Each of the resin compositions for ribbons in Examples and Comparative Examples was prepared by mixing 70 parts by mass of any one of urethane acrylates UA-1 to 6, 10 parts by mass of 2-phenoxyethyl acrylate, 13 parts by mass of tripropylene glycol diacrylate, 5 parts by mass of N-vinylcaprolactam, 1 part by mass of 1-hydroxycyclohexyl phenyl ketone, 1 part by mass of 2,4,6-trimethylbenzoyldiphenylphosphine oxide, and silicone oil. The resin compositions were prepared by changing the type of urethane acrylate and the amount of silicone oil compounded.

[Resin Composition for Primary Resin Layer]

A resin composition P for the primary resin layer was prepared by mixing 75 parts by mass of urethane acrylate, which is a reaction product of polypropylene glycol having a molecular weight of 2000, 2,4-tolylene diisocyanate, 2-hydroxyethyl acrylate and methanol, 14 parts by mass of nonylphenol EO-modified acrylate, and 7 parts by mass of N-vinylcaprolactam, 2 parts by mass of 1,6-hexanediol diacrylate, 1 part by mass of 2,4,6-trimethylbenzoyl diphenylphosphine oxide, and 1 part by mass of γ-mercaptopropyl trimethoxysilane.

[Resin Composition for Secondary Resin Layer]

A resin composition S for the secondary resin layer was prepared by mixing 60 parts by mass of urethane acrylate, which is a reaction product of polypropylene glycol having a molecular weight of 1000, isophorone diisocyanate and 2-hydroxyethyl acrylate, 19 parts by mass of isobornyl acrylate, 20 parts by mass of trimethylolpropane triacrylate, and 1 part by mass of 2,4,6-trimethylbenzoyldiphenylphosphine oxide.

[Resin Composition for Colored Layer]

A resin composition C for the colored layer was prepared by mixing 75 parts by mass of urethane acrylate, which is a reaction product of polypropylene glycol having a molecular weight of 1000, 2,4-tolylene diisocyanate and 2-hydroxyethyl acrylate, 10 parts by mass of bisphenol A/ethylene oxide addition diol diacrylate, 7 parts by mass of isobornyl acrylate, 2 parts by mass of 1-hydroxycyclohexane-1-yl phenyl ketone, 3 parts by mass of copper phthalocyanine, and 3 parts by mass of titanium oxide.

[Preparation of Optical Fiber]

A primary resin layer having a thickness of 17.5 μm was formed from the resin composition P on the outer periphery of a glass fiber having a diameter of 125 μm composed of a core and a cladding, and further, a secondary resin layer having a thickness of 15 μm was formed from the resin composition S on the outer periphery thereof, so that an optical fiber was prepared. Subsequently, after the optical fiber was once wound, a colored layer having a thickness of 5 μm was formed on the outer periphery of the secondary resin layer from the resin composition C while unreeling the optical fiber again with a coloring machine, so that an optical fiber having a diameter of 200 μm (hereinafter referred to as "colored optical fiber") was prepared. When each of the resin layer was formed, the line speed was 1500 m/min.

(Young's Modulus)

The Young's modulus of the secondary resin layer was obtained from the 2.5% secant line value in a tensile test (distance between marked lines: 25 mm) at 23° C. of a pipe-shaped coating resin layer (length: 50 mm or more) obtained by immersing an optical fiber in a solvent (ethanol:acetone=3:7) and pulling a glass fiber out. The Young's modulus of the secondary resin layer was 1200 MPa.

The Young's modulus of the primary resin layer was measured by the Pullout Modulus (POM) method at 23° C. Two points of the optical fiber were fixed with two chuck devices, and the coating resin layer (primary resin layer and secondary resin layer) portion between the two chuck devices was removed. Then, one chuck device was fixed and the other chuck device was gently moved in the opposite direction of the fixed chuck device. When the length of a portion of the optical fiber grasped by the moving chuck device is represented by L, the moving amount of the chuck by Z, the outer diameter of the primary resin layer by Dp, the outer diameter of the glass fiber by Df, and the Poisson's ratio of the primary resin layer by n, and the load during movement of the chuck device by W, the Young's modulus of the primary resin layer was obtained from the following formula. The Young's modulus of the primary resin layer was 0.6 MPa.

Young's modulus $(MPa) = ((1+n)W/\pi LZ) \times \ln(Dp/Df)$

[Preparation of Optical Fiber Ribbon]

Figure 5:
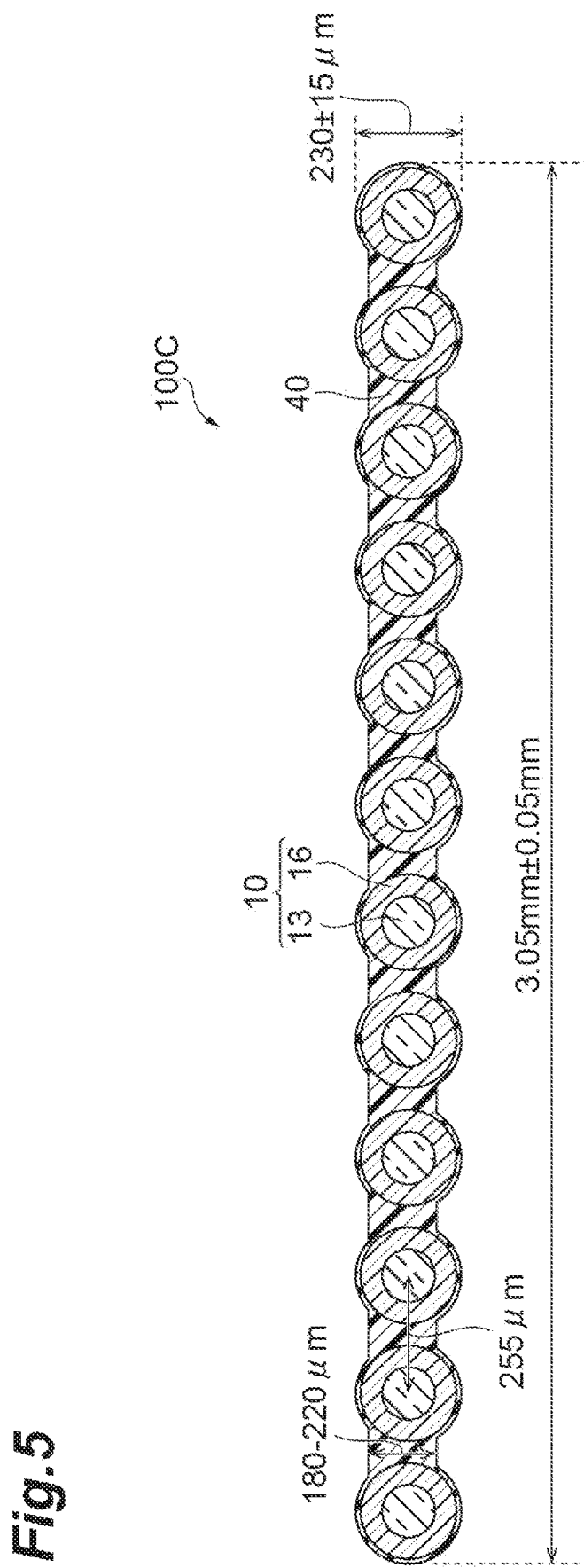
FIG. 5 is a schematic cross-sectional view showing an optical fiber ribbon according to an embodiment.

A resin composition for a ribbon was applied around 12 colored optical fibers and then cured by irradiation with ultraviolet rays to form a connecting resin layer, so that an optical fiber ribbon shown in FIG. 5 was prepared. FIG. 5 is a schematic cross-sectional view showing a prepared optical fiber ribbon 100C. The optical fibers 10 are connected by a ribbon resin at regular intervals. The thickness of the connecting portion between the optical fibers was 180 μm to 220 μm, the distance between the centers of the adjacent optical fibers was 255 μm, the thickness of the optical fiber ribbon was 230 μm±15 μm, and the width of the optical fiber ribbon was 3.05 mm±0.05 mm.

The following evaluations were made on the optical fiber ribbon. The evaluation results of the optical fiber ribbon prepared in Examples are shown in Table 1, and the evaluation results of the optical fiber ribbon prepared in Comparative Examples are shown in Table 2.

(Young's Modulus)

The Young's modulus of the ribbon resin layer was obtained from the 2.5% secant line value in a tensile test (distance between marked lines: 25 mm) at 23° C. of a resin layer halved by a single-edged blade. The Young's modulus of the ribbon resin layer was 800 MPa.

(Measurement of Amount of Sn and Amount of Si)

The amount of Sn and the amount of Si at the surface of the connecting resin layer of the optical fiber ribbon were measured by X-ray photoelectric spectroscopy using a QuanteraSXM manufactured by ULVAC-PHI. The measurement was performed under the following conditions according to JIS K 0146: 2002.

X-ray conditions: 100 μm, 25 W, 15 kV
Transmitted energy: wide: 280 eV, narrow: 55 eV, depth: 112 eV
Charge neutralization: electron+Ar
X-ray incident angle: 90°
Photoelectron take-off angle: 450
Ion gun conditions at depth: 0.5 kV, 1 kV, 2 kV, 1×1
Average sputtering rate: 1.69, 6.51, 24.39 nm/min (Single Fiber Separation)

An optical fiber ribbon having a length of 1 m was stored in an environment at 85° C. and 85% for 60 days. The optical fiber ribbon was bared to the single fiber at an end over several cm and separated in the longitudinal direction of the optical fiber ribbon. The ribbon resin tended to remain on the end fiber of the optical fiber ribbon. In the evaluation, the case where the ribbon resin was peeled for a length of 1 m without break was evaluated as "A", the case where the ribbon resin was peeled for a length of 1 m within 5 times of break of the ribbon resin was evaluated as "B", and the case where the break of ribbon resin occurred 6 times or more, the case where the ribbon resin was unable to be peeled, or the case where the colored layer was peeled even though the peeling was possible, was evaluated as "C".

(Peeling Resistance)

After compressing the optical fiber ribbon 10 times in the width direction, the case where no fiber spill occurred was evaluated as "OK", and the case where fiber spill occurred was evaluated as "NG".

[Preparation of Optical Fiber Cable]

An optical cable was prepared by filling the inside of a slotless cable having an outer diameter of 11 mm with an optical fiber ribbon, such that the fiber density was 4.55 fibers/mm$^2$.

(Cable Loss Characteristics)

The optical fiber cable was allowed to stand in an environment of 23° C., and the value of the transmission loss for a wavelength of signal light of 1.55 μm was measured. The measured values were evaluated according to the following criteria.

A: transmission loss of 0.25 dB/km or less.
B: transmission loss of more than 0.25 dB/km and 0.3 dB/km or less.
C: transmission loss of more than 0.3 dB/km.

TABLE 1

| Example | Urethane acrylate | Sn (ppm) | Si (ppm) | Single fiber separation | Peeling resistance | Cable loss characteristics (dB/km) |
|---|---|---|---|---|---|---|
| 1 | UA-1 | 10 | 10 | B | OK | A |
| 2 | UA-2 | 3000 | 2000 | A | OK | A |
| 3 | UA-2 | 3000 | 5000 | A | OK | A |
| 4 | UA-3 | 100 | 40000 | A | OK | A |
| 5 | UA-2 | 3000 | 40000 | A | OK | A |
| 6 | UA-1 | 10 | 50000 | A | OK | A |
| 7 | UA-4 | 4000 | 50000 | A | OK | A |
| 8 | UA-5 | 20000 | 10 | B | OK | A |

TABLE 2

| Comparative Example | Urethane acrylate | Sn (ppm) | Si (ppm) | Single fiber separation | Peeling resistance | Cable loss characteristics (dB/km) |
|---|---|---|---|---|---|---|
| 1 | UA-1 | 10 | 1 | C | OK | A |
| 2 | UA-6 | 100000 | 10 | A | NG | A |
| 3 | UA-1 | 10 | 100000 | A | NG | A |

REFERENCE SIGNS LIST 10, 10A: OPTICAL FIBER
11: CORE
12: CLADDING
13: GLASS FIBER
14: PRIMARY RESIN LAYER
15: SECONDARY RESIN LAYER
16: COATING RESIN LAYER
20: CONNECTING PORTION
21: NON-CONNECTING PORTION
40: CONNECTING RESIN LAYER
100, 100A, 100B, 100C: OPTICAL FIBER RIBBON

What is claimed is:

1. An optical fiber ribbon comprising:

a plurality of optical fibers arranged in parallel; and a connecting resin layer containing a ribbon resin for coating and connecting the plurality of optical fibers, wherein each of the plurality of optical fibers has an outer diameter of 220 μm or less; and the ribbon resin contains a cured product of urethane (meth)acrylate, and the surface of the connecting resin layer contains an amount of silicon of 5 ppm or more and 80000 ppm or less and an amount of tin of 5 ppm or more and 30000 ppm or less, and wherein each of the plurality of optical fibers includes a glass fiber and a coating resin layer, and the glass fiber includes a core and a cladding.

2. The optical fiber ribbon according to claim 1, wherein the amount of silicon is 100 ppm or more and 60000 ppm or less, and the amount of tin is 10 ppm or more and 20000 ppm or less.

3. The optical fiber ribbon according to claim 1, wherein the average distance between the centers of adjacent optical fibers among the plurality of optical fibers is 220 μm or more and 280 μm or less.

4. The optical fiber ribbon according to claim 1, wherein the ribbon resin further contains a silicone-based lubricant.

5. The optical fiber ribbon according to claim 1, wherein the optical fiber ribbon has a connecting portion and a non-connecting portion intermittently in the longitudinal direction and the width direction.

6. The optical fiber ribbon according to claim 1, wherein the connecting resin layer has a recess at the portion connecting adjacent optical fibers among the plurality of optical fibers.

7. An optical fiber cable comprising the optical fiber ribbon according to claim 1 incorporated in the cable.

* * * * *